United States Patent Office 3,487,287
Patented Dec. 30, 1969

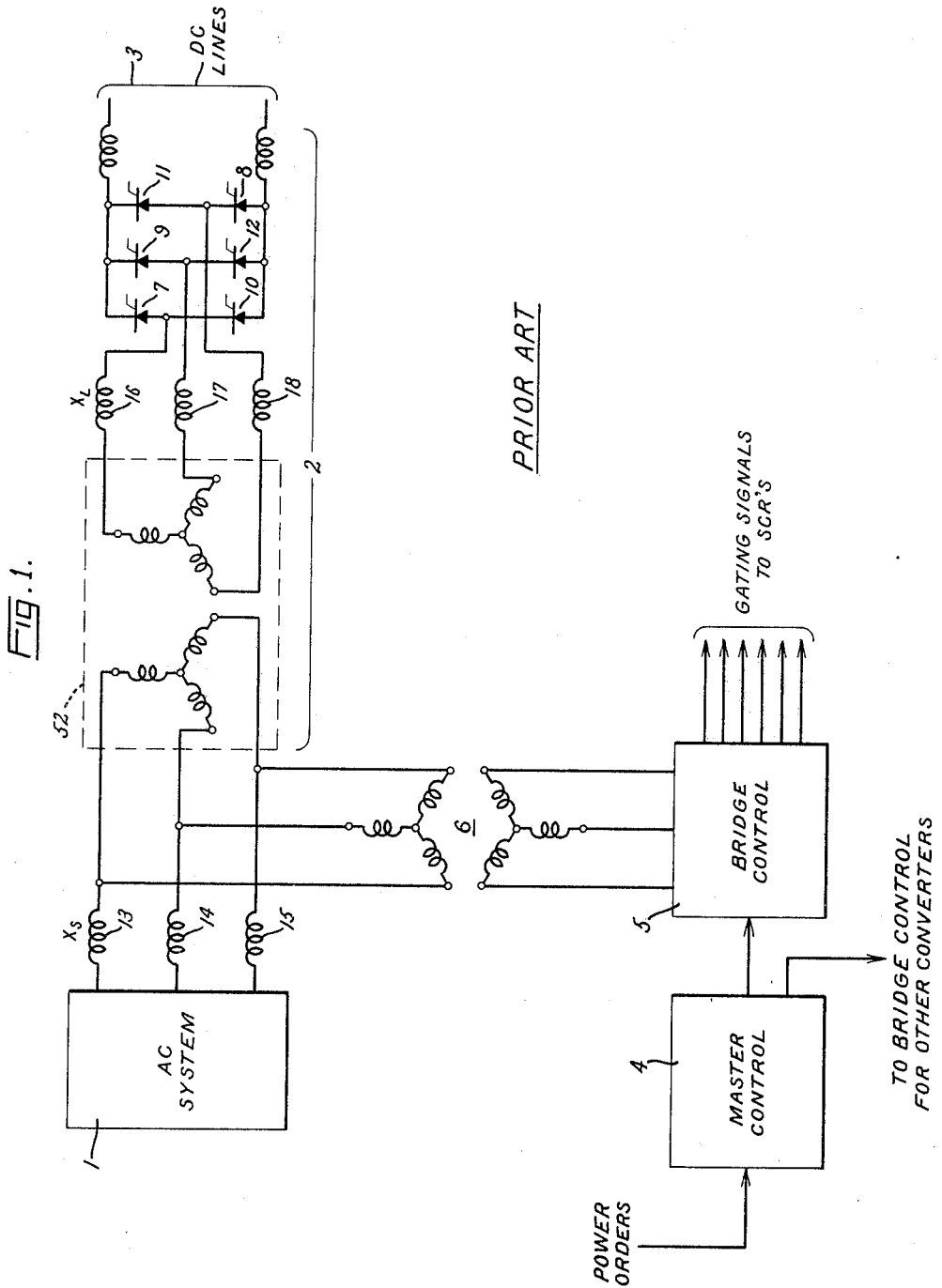

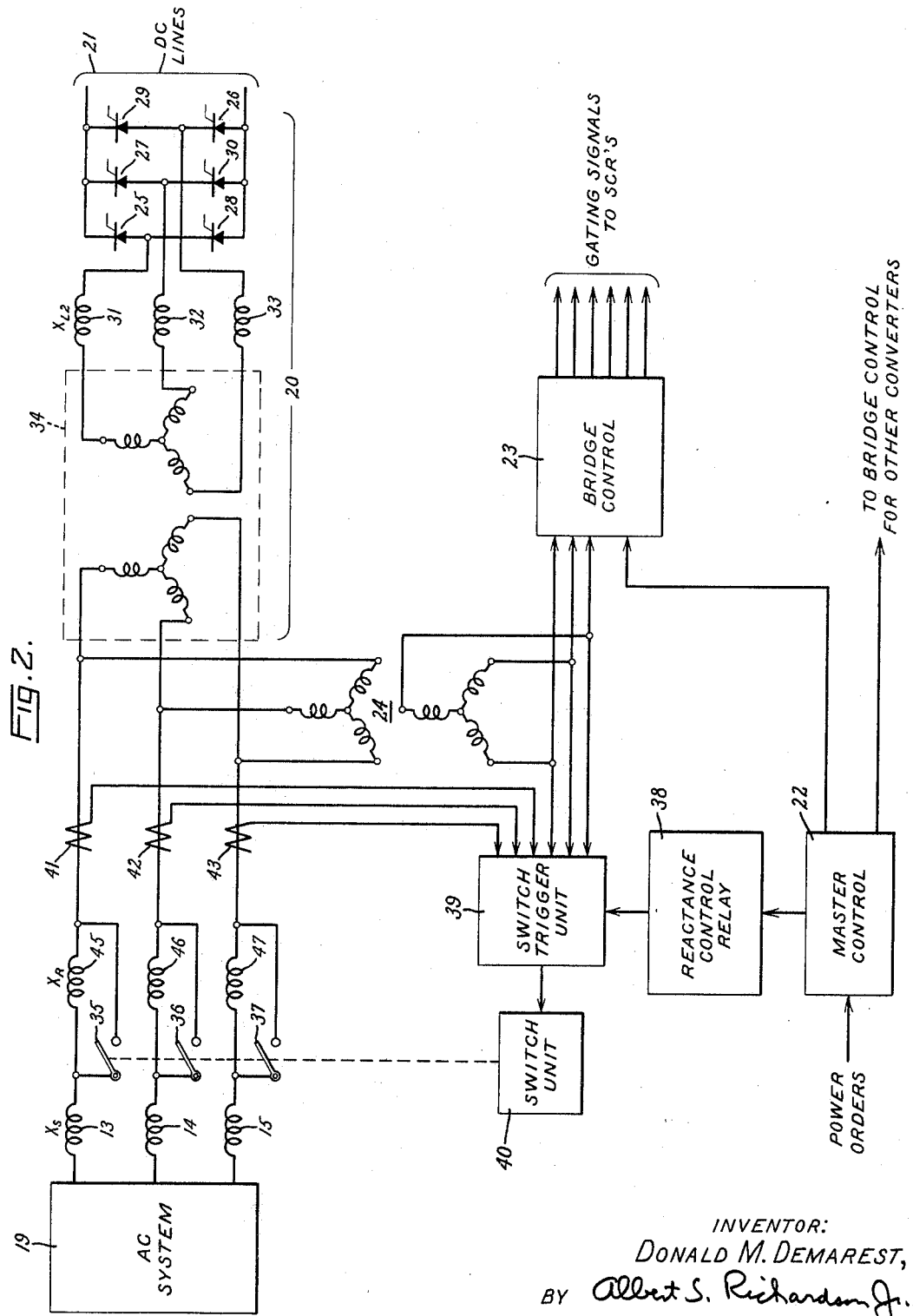

3,487,287
STATIC POWER CONVERTER WITH VARIABLE COMMUTATION REACTANCE
Donald M. Demarest, Media, Pa., assignor to General Electric Company, a corporation of New York
Filed Nov. 14, 1967, Ser. No. 682,910
Int. Cl. H02m 7/70
U.S. Cl. 321—9          5 Claims

ABSTRACT OF THE DISCLOSURE

My idea is to vary the commutation reactance of a solid state electric power converter as a function of whether the converter is operating as a rectifier or an inverter. The total commutation reactance includes inductors disposed in series with the respective phase conductors on the converter's A-C side, and each inductor is shunted by a controllable switch. Means is provided (1) for closing the switches, thereby shorting the inductors and reducing commutation reactance, in response to the converter being conditioned to operate as an inverter, and (2) for opening the switches in response to the converter being conditioned to operate as a rectifier.

Background of the invention

This invention relates generally to improvements in high voltage static power converters. More specifically, it relates to improvements in high voltage static power converters of the kind that can be operated alternatively in either a rectifying mode (converting A-C to D-C) or an inverting mode (converting D-C to A-C).

In the present state of the high-voltage electric power conversion art switching is ordinarily accomplished by electric valves comprising high-voltage, heavy current, grid-controlled mercury-arc tubes. Typically, six such valves may be arranged in a three-phase double-way bridge configuration having three separate A-C terminals and a set of positive and negative D-C terminals. By sequentially firing the six valves in the proper order and in synchronism with the voltages of the three-phase electric power system to which the A-C terminals of the bridge are connected, the flow of power between the A-C and D-C terminals can be controlled as desired.

The time at which a valve is fired, measured in electrical degrees from the cyclically recurring instant that its anode voltage first becomes positive with respect to cathode, is known as the "firing angle." As the firing angle is increased from zero, the average magnitude of the rectified voltage between the positive and negative D-C terminals decreases from its maximum positive level. As the firing angle approaches 90°, the average D-C voltage reverses polarity and the bridge commences to operate in its inverting mode, whereby power can be transmitted from the D-C to the A-C terminals.

In the foregoing setting, forward current conduction in a valve is stopped at the end of its conducting interval each cycle by line voltage commutation. "Commutation" is the name given the definite transfer of load current from one valve (the relieved or "outgoing" valve) to the next-conducting valve (the relieving or "incoming" valve). During a period of commutation, also known as overlap time, current in the incoming valve rises from zero to full load and current in the outgoing valve falls from full load to zero, and while both valves are thus conducting, two phases of the A-C system are effectively short-circuited. Current in this short-circuit is limited by commutation reactance X which is comprised of the source impedance (A-C system) and leakage reactance of a transformer which in a typical converter is provided between the D-C link and the A-C system.

Commutation reactance is also relied on to limit A-C fault current in the event of short circuits caused by valve or bridge malfunctions. In converters using mercury-arc valves, backfires (arcbacks) are expectable and are likely to occur at a time in the voltage cycle that results in a peak fault current greatly exceeding (e.g., tenfold) the maximum current during normal commutation. Therefore, in prior art high-voltage electric power converters the value of commutation reactance has actually been determined by the need to protect the converter elements against this worst possible short-circuit or fault current. Since the source impedance is relatively fixed, the desired value of commutation reactance is usually obtained by designing the transformer to have a selected value of leakage reactance.

If the converter valves comprise solid state silicon controlled rectifiers (SCR's) rather than mercury-arc tubes, A-C inverter fault currents will be inherently limited by the SCR's which will not conduct in the reverse direction. That is, the reverse impedance of an SCR converter element is always high, whereas the reverse impedance of a mercury-arc tube is relatively low on the occasion of an arcback. For this reason the commutation reactance for a solid state inverter can be much smaller than that required for a solid state rectifier or for a mercury-arc valve rectifier or inverter.

Due to the commutation reactance a finite overlap time is always present in the operation of an inverter. This overlap time, plus a prerequisite margin angle (see below), establishes a practical limit on the firing angle of an inverter that results in an inherent phase displacement (non-unity power factor) between current and voltage, whereby the inverter must be supplied with some reactive volt-amperes (vars). Thus, the consumption of a certain minimum amount of vars is associated with inverter installations, and the longer the overlap time, the greater the vars. Since the value of commutation reactance X directly affects the overlap time of the inverter, it follows that reducing commutation reactance will advantageously decrease the reactive volt-amperes consumption. Even if the quantum of power factor correction were not decreased, smaller commutation reactance is desirable because it enables the inverter safely to commutate a higher level of overcurrent I. The inverter will continue successful commutation only so long as the IX drop does not exceed a predetermined critical value, and therefore the lower the commutation reactance the greater the level of permissible overcurrent. Inverter stability is improved by raising the level of permissible overcurrent; it can continue operating under more severe voltage disturbances in the A-C system.

Summary of the invention

Accordingly, it is an object of my invention to optimize a solid state electric power converter to take advantage of an inherently lower value of commutation reactance required when the converter is operating as an inverter.

It is a more specific object of my invention to provide an SCR static power converter in which commutation reactance impedances are provided which may be switched in or out of the converter circuit depending on whether the converter is operating as a rectifier or an inverter, respectively.

Briefly, according to one embodiment of my invention, there is provided an improved static power converter adapted for operation as either a rectifier or an inverter in which a smaller value of commutation reactance is used when operating as an inverter. Since the value of the commutation reactance is comprised chiefly of the A-C source impedance and the leakage reactance of a transformer provided between the converter valves and the A-C source, the minimum commutation reactance necessary for proper inverter operation is achieved by providing the transformer with a leakage reactance such that the sum of the A-C source impedance and the leakage reactance of the transformer is just equal to the minimum commutation reactance necessary for proper inverter operation. For operation of the converter as a rectifier, impedances are provided which are switched into the converter circuit to increase the commutation reactance to a value sufficient to limit fault currents or disturbances which might appear in the circuit and which would not be blocked by the converter valves.

Detailed description

The subject matter which is regarded as the invention is particularly pointed out and distinctly claimed in the concluding portion of this specification. The invention, both as to organization and method of operation, together with further objects and advantages thereof, may be understood by reference to the following description taken in connection with the accompanying drawings in which:

FIG. 1 is a schematic diagram of a prior art static power converter having a fixed commutation reactance; and FIG. 2 is a schematic diagram illustrating an improved static power converter utilizing the invention.

As shown in FIG. 1, an A-C system 1 is connected through a converter 2 to D-C lines 3. In a typical converter system, power orders as to the direction and quantity of power to be transmitted or interchanged are entered into a master control 4 for the system. The master control is in communication with a bridge control 5 for each converter in the system. The master control 4 informs the bridge control 5 as to whether operation as an inverter or rectifier is to follow and what the overlap phase angle is to be. Bridge control 5 senses through means of transformers 6 the instantaneous line voltage of the three A-C phases and repetitively applies a train of six gating signals to valves 7, 8, 9, 10, 11 and 12 at the proper time in relationship to the instantaneous phase voltage for each phase.

In FIG. 1, the source impedance of the A-C system ($X_s$) is schematically represented by impedances 13, 14 and 15. Leakage reactance of transformer 52 ($X_L$) is schematically represented as impedances 16, 17 and 18. The value of the commutation reactance is approximately equal to $2(X_s+X_L)$. This value of commutation reactance is selected so as to protect the converter valves against too high a fault current during abnormal conditions such as a short in the valves or across the bridge and, in a prior art system as shown in FIG. 1, this value of commutation reactance is the same whether the converter is operating as a rectifier or an inverter.

FIG. 2 illustrates an improved solid state electric power converter in which my invention is utilized. An A-C system 19 is connected through a converter 20 to positive and negative D-C lines 21. Power orders as to the direction and quantity of power are entered into a master control 22, which is the master control for an entire converter system.

Each converter in the system has associated therewith a bridge control 23 whose function is to provide gating pulses to the converter valves 25, 26, 27, 28, 29, 30. The master control 22 supplies the bridge control 23 with information as to whether operation as a rectifier or an inverter is to take place and what the firing angle is to be for providing the desired output magnitude, taking into account the predictable overlap or commutation angle. The bridge control 23 senses through a transformer 24 the instantaneous phase voltages of the A-C phases and supplies gating pulses to valves 25, 26, 27, 28, 29, and 30 in their numbered order for either inverter or rectifier operation and at the proper time in relationship to the instantaneous phase voltages of the A-C lines to obtain the desired result. Each of the converter valves shown symbolically in FIG. 2 actually comprises a plurality of silicon controlled rectifiers (SCR's) suitably arranged for switching and conducting effectively in unison.

In line voltage commutation, the voltage available for effecting commutation is the A-C voltage between corresponding electrodes of the relieved and the relieving converter valves. Commutation must always be completed in advance of the zero passage of reverse voltage across the relieved valve. The interval of time beginning at the moment that forward current in the relieved valve is reduced to zero and ending when this valve is next subjected to forward anode-to-cathode voltage is known as the margin angle, and commutation is likely to fail if the margin angle were less than a minimum amount necessary for the relieved valve to recover its ability to block forward voltage. It is always possible that the shape of the alternating current curve (A-C phase voltage) may contain irregularities or transients which tend to prevent timely completion of commutation. For example, a reduction of the voltage in one or some of the phases of the A-C line, which is often accompanied by an increase in current, causes an increase in the amount of time necessary for complete commutation. Obviously, in such a case, commutation must begin earlier than normal to preserve the prerequisite minimum margin angle.

In order to take into account such described irregularities as may occur, the instant of initiating the commutation can be limited according to the instantaneous value of the phase voltages in the A-C lines. To this end, bridge control 23 senses through transformers 24 the instantaneous phase voltages of the A-C lines and supplies gating pulses to identical valves 25, 26, 27, 28, 29 and 30 in their numbered order at a time which insures that commutation will be successfully completed. Although not shown in the embodiment of the improved converter illustrated in FIG. 2, conventional control or regulating means can also be provided to make the timing of the gating pulses dependent upon other factors as well, such as, for example, the magnitude of load current, the commutating reactance and the value of D-C voltage.

Circuits for supplying the converter valves with gating pulses of proper form and sequence are well known in the art and are therefore not shown in detail herein. Inputs to the bridge control 23 include the A-C phase voltages sensed through transformers 24 and a signal from the master control 22 representative of the desired converter operation. The output of the bridge control 23 is a train of gating pulses supplied to the respective valves 25–30 at the proper times to provide the desired mode of converter operation and to ensure that commutation between the converter valves will be completed in time.

The A-C system reactance ($X_s$) is schematically shown in FIG. 2 by reactances 13, 14, and 15 shown in each phase of the A-C line, and the leakage reactances ($X_{L2}$) of transformer 34 is schematically shown by reactances 31, 32 and 33. Each phase of the A-C line has an impedance ($X_R$) shown as inductors 45, 46 and 47 inserted therein. Shunting each of the inductors 45, 46 and 47 are switches 35, 36 and 37, respectively. When the converter is operating as a rectifier these switches are open and the value of a commutation reactance in the current is approximately equal to $2(X_s+X_R+X_{L2})$.

If the order to the master control for the system dictates that this converter is required to operate as an inverter, the master control 22 actuates a reactance control relay 38 which, in turn, sends a signal to the switch trigger unit 39. The switch trigger unit 39 responds by commanding a switch unit 40 to close the switches 35, 36 and 37, thereby shorting the series line reactances 45, 46 and 47. Switches 35, 36 and 37 do not, however, close unless synchronizing time signals are received through current transformers 41, 42, and 43 or potential transformers 24. These inputs allow switch trigger unit 39 to sense both voltage and current zeros for each phase of the A-C line. Switches 35, 36 and 37 can be actuated on signals synchronized with either current or voltage depending upon whether voltage or current disturbances present less of a problem in a particular converter circuit. Actually, the switches might be closed on one signal and opened on another. For example, since inverter operation requires the switches to close, and voltage disturbances are usually more of a problem in an inverter than current disturbances, switches 35, 36 and 37 might be closed at a point when the current in each of the respective A-C phases is at a zero. Changing to operation of the converter as a rectifier requires that switches 35, 36 and 37 be open, switching in impedances 45, 46 and 47. This can be done on either a voltage derived signal or a current derived signal and does not necessarily have to be the same signal or point at which the switches were closed. When switches 35, 36 and 37 are closed the commutation reactance for the inverter is then approximately equal to $2(X_s+X_{L2})$.

Switches 35, 36 and 37 may be any kind of fast-acting, controllable switches. I prefer, however, to use electronically triggered vacuum switches such as those disclosed in United States Patent No. 3,319,121, Lee, granted May 9, 1967, and assigned to the same assignee as the present invention. Immediate, fast switch action is achieved with these switches by injecting a plasma across a trigger gap. This is immediately followed by mechanical closing of a pair of switch contacts. When the mechanical contacts are fully closed, the plasma injection is stopped.

When the power order to the master control 22 requires the converter to operate as a rectifier, the reactance control relay 38 is alternately actuated and a new signal is sent to switch trigger unit 39. Switch trigger unit 39 senses current in the A-C phases through current transformers 41, 42, and 43, and senses voltage in the A-C phases through potential transformers 24. It, therefore, synchronously commands the switch unit 40 to open the respective switches 35, 36 and 37 on either a current or a voltage signal as desired. Switches 35, 36 and 37 are mechanically opened at the same time that plasma injection across the trigger gaps of the switches is initiated. The plasma injection is not discontinued until the predetermined synchronizing time signals for each switch are received.

While I have shown and described a particular embodiment of my invention, it will be obvious to those skilled in the art that various changes and modifications may be made without departing from my invention in its broader aspects, and I, therefore, intend to cover all such changes and modifications as fall within the true spirit and scope of my invention.

What I claim as new and desire to secure by Letters Patent of the United States is:

1. In an electric power converter connected between an A-C system and D-C lines and adapted to operate as either a rectifier or an inverter, the improvement comprising: a series inductor disposed between said converter and the A-C system, and switch means connected in parallel with said inductor, said switch means being operated to a first state when the converter is conditioned to operate as a rectifier and to a second state when the converter is conditioned to operate as an inverter.

2. The circuit of claim 1 in which there is an inductor disposed in series with each phase of the A-C system.

3. The circuit of claim 2 in which said first operated state of said switch means is open and said second operated state of said switch means is closed.

4. In a solid state electric power converter operating between three phase A-C lines and positive and negative D-C lines and adapted for operation as either a rectifier or an inverter, the improvement comprising: impedance means in each A-C line in series with said solid state converter, switch means connected in parallel with each said impedance means and operated to a first state when said converter is operating as a rectifier and to a second state when said converter is operating as an inverter, switch trigger means coupled to said switch means and operable at a predetermined advantageous point of either the voltage or current wave form of the A-C line in which each said impedance means is disposed to selectively operate said switch means to said first or said second state, and control means communicating with said switch trigger means signals which indicate whether converter operation as a rectifier or an inverter is to follow.

5. The circuit of claim 4 in which said impedance means is an inductor and said first operated state of said switch means is open and said second operated state of said switch means is closed.

References Cited

UNITED STATES PATENTS 3,366,837　1/1968　Mester _____ 317—20 X

FOREIGN PATENTS 330,969　6/1930　Great Britain.
371,502　10/1963　Switzerland.

LEE T. HIX, Primary Examiner

W. H. BEHA, JR., Assistant Examiner

U.S. Cl. X.R.

321—11, 45, 47